United States Patent [19]

Miyanaga

[11] Patent Number: 4,865,246
[45] Date of Patent: Sep. 12, 1989

[54] ANCHOR BOLT CONSTRUCTION AND METHOD OF MANUFACTURE

[75] Inventor: Masaaki Miyanaga, Hyogo, Japan

[73] Assignee: Kabushiki Kaisha Miyanaga, Hyogo, Japan

[21] Appl. No.: 204,224

[22] Filed: Jun. 9, 1988

[30] Foreign Application Priority Data

Dec. 18, 1987 [JP] Japan ................. 62-321735

[51] Int. Cl.$^4$ .............. B21B 39/00; B23K 31/02; F16B 13/06
[52] U.S. Cl. ................. 228/152; 228/173.6; 411/55; 411/60
[58] Field of Search ............ 411/44, 55, 57, 60, 411/61, 63, 64, 66; 228/151, 173.6, 152

[56] References Cited

U.S. PATENT DOCUMENTS

| | | | |
|---|---|---|---|
| 1,050,345 | 1/1913 | Conrad | 411/64 |
| 1,164,322 | 12/1915 | Yeatman | 411/55 |
| 1,811,678 | 6/1931 | Smith | 228/151 |
| 2,126,473 | 8/1938 | Keller | 228/173.6 |
| 2,762,119 | 9/1956 | Jackson | 411/61 |
| 3,722,053 | 3/1973 | Berry et al. | 228/173.6 |
| 4,330,230 | 5/1982 | Giannuzzi | 411/55 |
| 4,474,516 | 10/1984 | Schiefer | 411/55 |
| 4,556,163 | 12/1985 | Lundman | 228/173.6 |
| 4,560,311 | 12/1985 | Herb et al. | 411/54 |
| 4,636,123 | 1/1987 | Herb | 411/55 |

FOREIGN PATENT DOCUMENTS

| | | |
|---|---|---|
| 48-271 | 1/1973 | Japan . |
| 49-75964 | 7/1974 | Japan . |
| 50-106556 | 9/1975 | Japan . |
| 50-148464 | 12/1975 | Japan . |
| 57-167906 | 10/1982 | Japan . |
| 59-47163 | 11/1984 | Japan . |

Primary Examiner—Neill R. Wilson
Attorney, Agent, or Firm—Marshall, O'Toole, Gerstein, Murray & Bicknell

[57] ABSTRACT

An anchor bolt comprising a bolt having an upper cylindrical part with an outer thread adjacent its top and a lower conical head, and a sleeve surrounding the bolt, the sleeve comprising an upper cylindrical portion and an annular expander, the expander having multiple slits therein which open to the bottom end and extend axially. The slits form expansion pieces therebetween having curvatures which, before expansion of the pieces, are substantially the same as the curvatures at the corresponding positions of the outer peripheral wall of the conical head, which the pieces contact after expansion. One method of manufacturing the expander comprises the steps of forming a fan-shaped flat material having slits forming pieces between them, shaping the pieces so that their inner peripheral walls form arcs having substantially the same curvatures before expansion as the curvatures at the corresponding positions of the conical head which the pieces contact after expansion, shaping the sheet material into a cylindrical expander, and connecting both ends of the material. Another method of manufacturing the expander comprises the steps of forming a plurality of separate pieces, shaping each of the pieces to have curvatures before expansion substantially the same as the curvatures at the corresponding positions of the adjoining portion or the conical head after expansion of the pieces, and joining the pieces into a cylindrical shape.

2 Claims, 4 Drawing Sheets

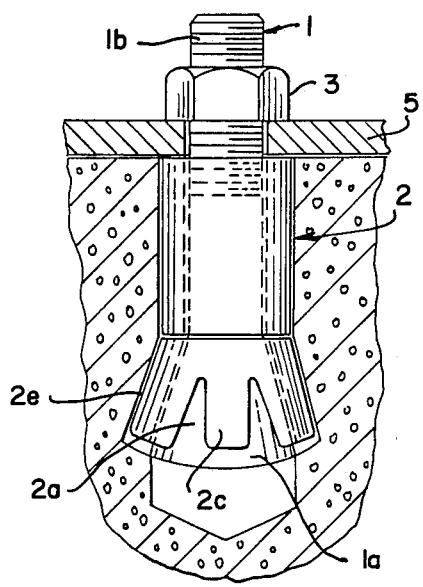
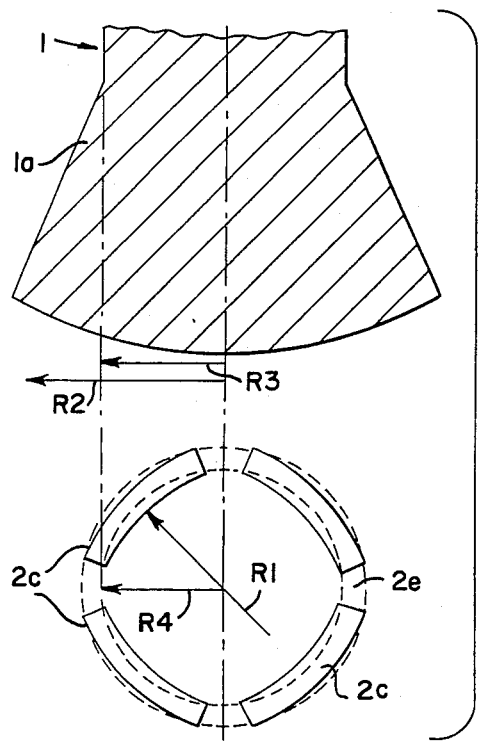
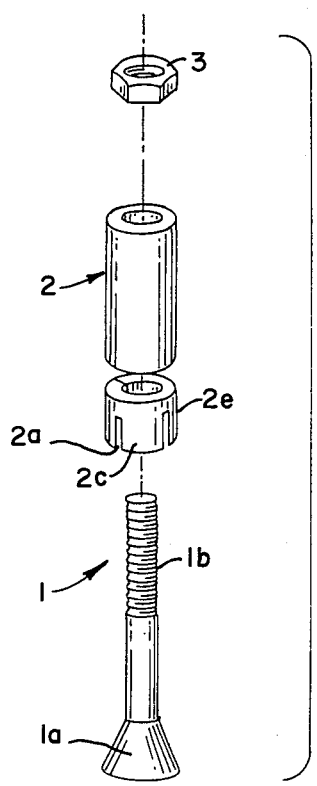
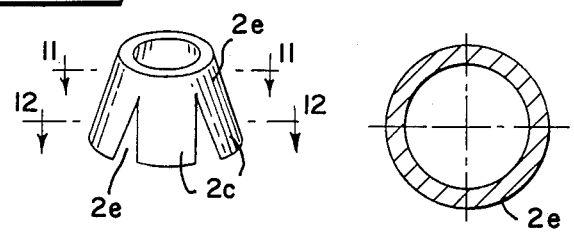
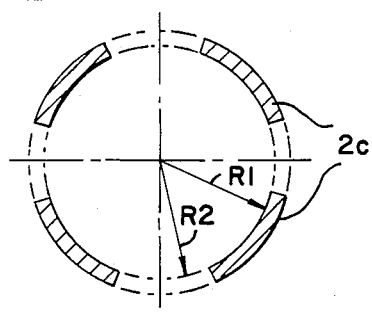

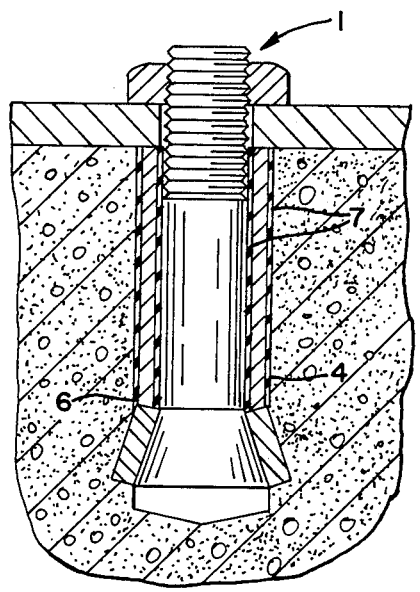
FIG_13_
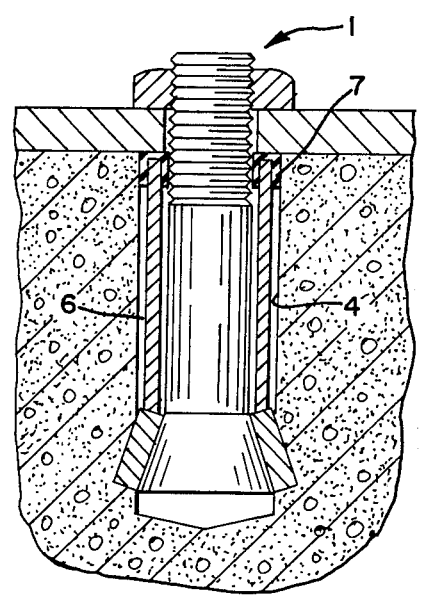
FIG_14_
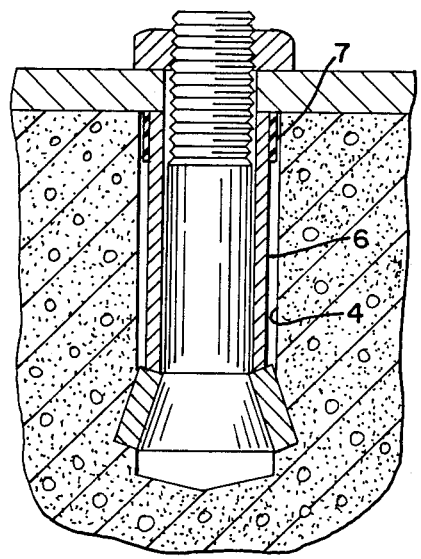
FIG_15_
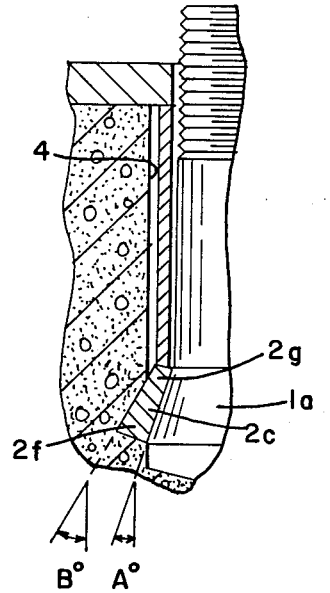
FIG_16_

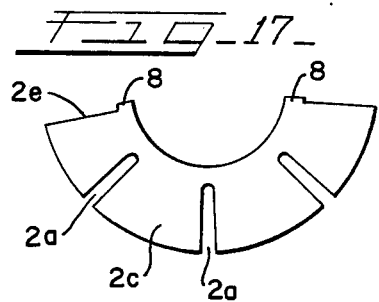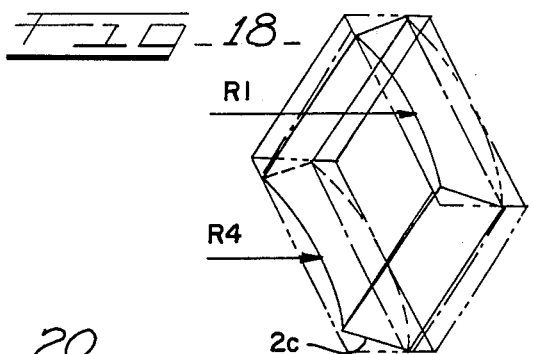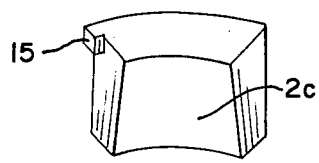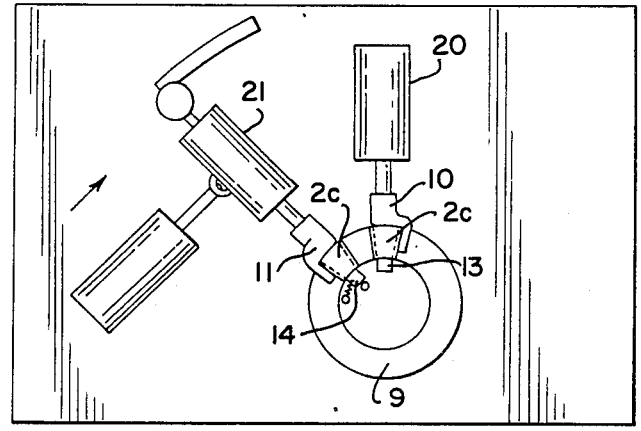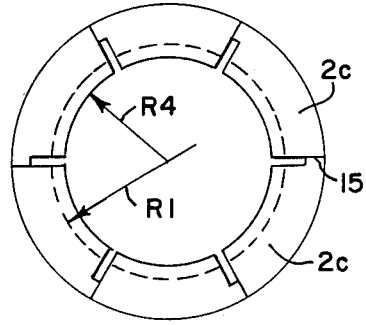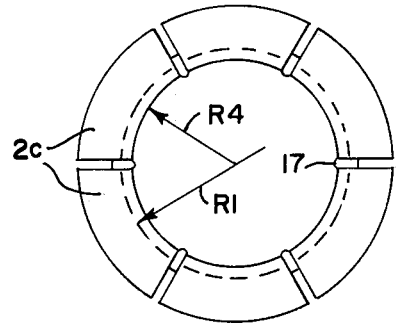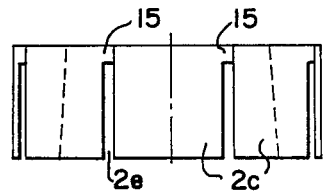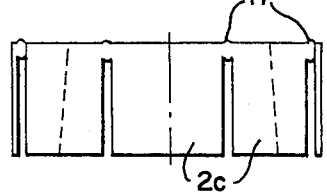

ANCHOR BOLT CONSTRUCTION AND METHOD OF MANUFACTURE

FIELD AND BACKGROUND OF THE INVENTION

This invention relates to an anchor bolt construction, and more particularly to an expansion sleeve part of an anchor bolt, and to a method of manufacture of an anchor bolt.

It is common in the prior art for anchor bolts to be embedded in a mounting surface, such as a solidified concrete surface (hereafter referred to simply as a concrete surface) as a means of mounting objects onto the concrete surface.

A conventional anchor bolt generally consists of a bolt body 1 and a sleeve 2 as shown in FIGS. 1 and 2. A hole 4 is drilled into the concrete surface and an enlarged part is undercut at the bottom of the hole, the enlarged part having a flared or conical surface. In order to allow the bolt body 1 to be embedded into the hole 4, the lower end or head 1a of the bolt body 1 is conical, and the upper end has a spiraling thread 1b for securing an object which is to be secured to the concrete surface.

In order to allow the bolt body 1 to pass through the hole 4 in the concrete surface when embedding it into the concrete surface, the maximum diameter of the tapered head 1a of the bolt body 1 is the same as or slightly smaller than the diameter of the upper non-flared part of the hole 4 in the concrete surface. As a result, there initially is a gap between the tapered head 1a of the bolt body 1 and the inner wall of the flared part of the hole 4. Then, the sleeve 2 is expanded into this gap in order to secure the bolt body 1 in the hole 4.

The sleeve 2 encloses the lateral circumference of the bolt body 1 and it is interposed between the flared part of the hole 4 and the head 1a. At the lower end of the sleeve 2, a plurality of slits 2a are formed in the axial direction and extend to the bottom of the sleeve. When this sleeve is installed, the lower end of the sleeve is expanded out to anchor the bolt body 1 in the flared part of the hole 4, as shown in FIG. 1.

Up until now, as shown in FIGS. 1 and 2, the sleeve 2 of the anchor bolt has been composed of a one-piece cylinder for the entire length of the sleeve 2. The slits 2a which open to the bottom end of the sleeve have been formed in the lower end of this cylinder in the axial direction, thus providing, at the lower end of the sleeve 2, expansion sleeve pieces 2c between the slits which are capable of flaring out freely. Thus, as shown in FIGS. 4 and 5, the radius of curvature R1' (refers to the curvature in the transverse direction; the same holds true hereafter) of the inner walls of the expansion sleeve pieces 2c has been the same as the radius of curvature R3 (FIG. 3) of the upper parts of the sleeve 2 where the slits 2a were not formed (in other words, the curvature of the inner wall of the cylinder).

For this reason, when the installation of the anchor bolt is complete after expanding the pieces 2c as shown in FIGS. 1 and 5, the radius of curvature R1' of the inner peripheral wall of the expansion sleeve pieces 2c has been considerably smaller than the radius of curvature R2' of the outer peripheral wall of the tapered head 1a at the lower end of the bolt body (see FIG. 5). As a result, the anchoring of the head 1a of the anchor bolt 1, when it is anchored in the hole, has been unstable.

In other words, if a powerful force were to act upon the anchor bolt 1 in either the lateral direction or the axial direction, because the expansion sleeve 2 would tend to deform outwardly as indicated by the arrows 18 in FIG. 5, the radii of curvature of the outer and inner walls of the expansion sleeve would tend to widen, as shown in FIG. 6, so as to approach or become the same as the radius of curvature R5 of the inner peripheral wall of the flared part of the hole 4; or the radius of curvature R2' of the outer peripheral wall of the tapered head at the lower end of the bolt body.

Thus, when the curvature of the lower expansion part of the sleeve widened, a gap 19 (see FIG. 6) would appear between the anchor bolt and the hole in which it was embedded, making it impossible to maintain a strong and stable anchorage of the anchor bolt in the hole.

In addition, with the anchor bolt sleeves used up until now, because the lower expansion part and the upper cylindrical part were constructed in a single piece, internal stress from the upper cylindrical part, which would resist expansion, would act upon the intermediate connecting portion between the parts, thus making it difficult for that connecting portion to expand during installation. As a result, when the anchor bolt was embedded, this intermediate connecting portion would sometimes not be in perfect contact with the outer peripheral wall of the bolt body, which would then cause looseness in the anchor bolt after it had been embedded in the mounting surface.

It is a primary object of this invention to provide an anchor bolt expansion sleeve and a manufacturing method for such a sleeve, which avoids the problems described above and which can be constructed at low cost.

SUMMARY OF THE INVENTION

An anchor bolt according to this invention includes a bolt body having a conical head at its lower end. The bolt body is enclosed by a sleeve, which comprises an upper cylindrical part and a lower annular expander. The expander is formed with multiple slits which extend axially and open to the bottom end. The slits form expansion pieces between them. The radii of curvature at different positions of the inner peripheral walls of the pieces are sized, before expansion, to be substantially the same as those at the corresponding positions of the outer peripheral wall of the bolt head, which they contact after expansion.

The invention further comprises methods of manufacturing the annular expander.

The first method includes the following steps:

1. A metal sheet is cut into an arcuate member with multiple pieces sectioned off by slits.
2. The pieces are processed and shaped so that their inner peripheral walls form arcs or partial circles, which have curvatures substantially the same as those of the outer peripheral wall of the bolt head.
3. The arcuate member is then formed into a cylindrical shape, and its ends are connected.

The second method includes the following steps:

1. A number of separate expansion pieces are formed.
2. The pieces are shaped to the curvatures described above, and the necessary number of them are joined together to form the annular expander.

BRIEF DESCRIPTION OF THE DRAWINGS

The invention will be better understood from the following detailed description taken in conjunction with the accompanying figures of the drawings, wherein:

FIG. 7 is an elevational view, in the installed state, of an anchor bolt according to one embodiment of this invention;

FIG. 8 an exploded perspective view of the anchor bolt of FIG. 7, but showing the annular expander before expansion;

FIG. 9 is a view showing the relative dimensions of the expander and the bolt head as shown in FIG. 8;

FIG. 10 is a perspective view of the expander as shown in FIG. 7;

FIGS. 11 and 12 are sectional views taken on the lines 11 and 12, respectively, of FIG. 10;

FIGS. 13–16 are vertical cross-sectional views of additional embodiments of anchor bolts according to the invention;

FIG. 17 is a plan view of an expander during a first manufacturing method according to the invention;

FIGS. 18 and 19 are perspective views of separate expansion pieces during different processes of a second manufacturing method according to the invention;

FIG. 20 is a top view of apparatus used in the first process of the second method;

FIGS. 21 and 22 are top and side views, respectively, of an expander fabricated the first process;

FIGS. 23 and 24 top and side views, respectively, of an expander fabricated by the second process.

DETAILED DESCRIPTION OF THE DRAWINGS

Figure 1:
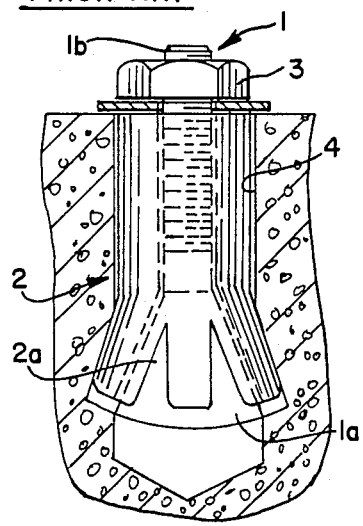
FIG. 1 is an elevational view of a prior art anchor bolt.
Figure 2:
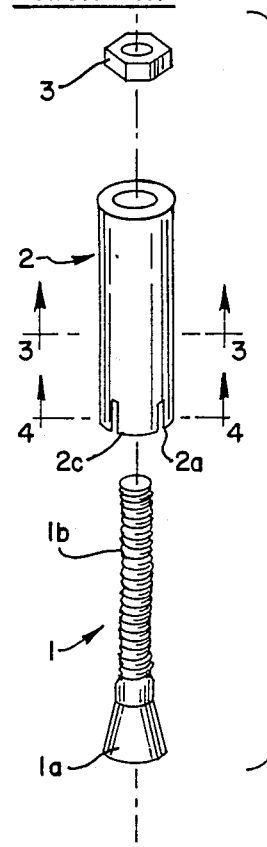
FIG. 2 is an exploded view of the prior art bolt.
Figure 3:
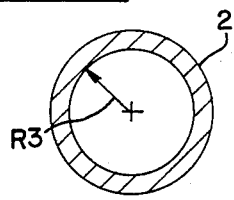
FIG. 3 is a sectional view taken on the line 3—3 of FIG. 2.
Figure 4:
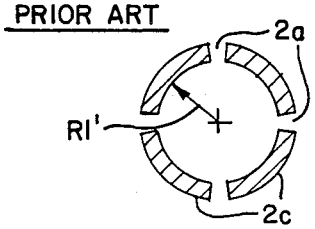
FIG. 4 is a sectional view taken on the line 4—4 of FIG. 2.
Figure 6:
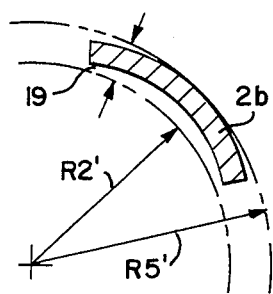
FIG. 6 is a view similar to FIG. 5, but shows the sleeve in a deformed condition.
Figure 5:
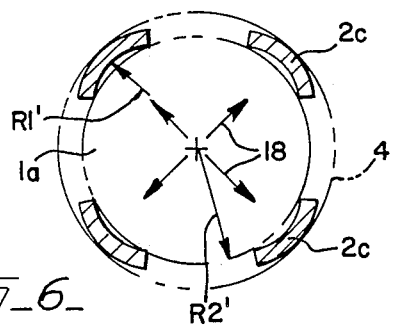
FIG. 5 is a view similar to FIG. 4, but shows the sleeve after expansion.

In the drawings, the same reference numerals are used throughout to designate corresponding parts.

With reference to FIGS. 7 and 8, the bolt body 1 has at its lower end a downwardly flared conical head 1a and at its upper end is a spiraling thread 1b. The bolt body 1 is enclosed by an upper hollow cylindrical sleeve 2 and a separate lower annular expander 2e, which is in contact with the bolt head 1a. The expander 2e has expansion pieces 2c sectioned off between radial slits 2a, which are formed in the lower end of the expander 2e and extend to the bottom. The sleeve 2 is located above the expander 2e and encloses and fits closely with the outer peripheral wall of the cylindrical shaft of the bolt body 1.

As shown in FIG. 9, the radii of curvature R1 in the transverse direction at different positions of the inner walls (before expansion) of each expansion piece 2c are sized to be substantially the same as the radii of curvature R2 at the corresponding positions of the bolt head 1a, which comes in contact with the inner walls of the pieces 2c.

In use, the expander 2e is mounted on the bolt body 1 from above, and then the sleeve 2 is mounted on the bolt body 1 on top of the expander 2e. The anchor bolt is then inserted into the hole 4. A nut 3, over an object 5 (FIG. 7) to be secured, is then screwed onto the bolt body 1.

In this state, as shown in FIG. 8, the expansion pieces 2c are not yet flared. Then, when the nut 3 is tightened further, the sleeve 2 and expander 2e move downwardly on the bolt body 1. Accompanying this movement, the pieces 2c flare out along the conical shape of the bolt head 1a. When the nut has been tightened the specified amount, the expansion pieces 2c are forcefully pressed against the inner peripheral wall of the hole 4 by the bolt body 1, thus anchoring the bolt body 1 in the hole 4.

In the flared condition of the expansion pieces 2c, as shown in FIG. 7, the inner peripheral wall of the pieces 2c fits well against the outer peripheral wall of the bolt head 1a. As a result, even if a powerful force acts upon the upper end of the anchor bolt in either the lateral or axial direction, no gap will appear between the bolt head 1a and the pieces 2c.

When the expansion pieces 2c flare out along the side of the bolt head 1a, because the expander 2e is formed separately from the sleeve 2, it is possible for the pieces 2c to flare out much more easily than conventional expansion pieces, which are formed in one piece with the sleeve.

As shown in FIGS. 13–15, in order to prevent rain water, etc., from entering through the gap 6 between the anchor bolt and the hole 4 in which it is embedded, the anchor bolt can be constructed with sealant material 7, composed of elastic synthetic resin, rubber or the like, filling the gap. Three different forms of seals are illustrated in FIGS. 13–15. In each construction, the sealant material extends to and seals the upper end of the gap.

As shown in FIG. 16, by making the wall of the expansion pieces 2c thicker at their lower end 2f than at the upper end 2g so that the taper angle B of the hole 4 is greater than the predetermined taper angle A of the bolt head 1a, the contact surface between the sleeve pieces 2c and the hole 4 can be increased, thus providing greater anchoring strength.

Although not illustrated, it is also possible to form ridges in the transverse direction in the outer peripheral wall of the expander in order to increase the anchoring strength in the hole.

Although it was not expressly stated in the above explanation, if the curvature of the outer peripheral walls of the expansion pieces is made to be substantially the same (actually slightly smaller) as the curvature of the conical part of the hole, the hole and the anchor bolt will make face or surface contact. As a result, there will be less chance that wear of the outer peripheral surface of the anchor bolt will occur, and also, together with the effectiveness of the invention described above, even if a load repeatedly acts upon the anchor bolt, because the contact is face contact (with the prior art it was point or line contact), there will be less chance of looseness occurring as a result of wear, etc., and there will also be greater strength to resist any bending moment.

A first method of manufacturing the annular expander of the invention includes the following steps:

1. As shown in FIG. 17, a flat sheet of metal is cut to an arcuate or fan-shaped member 2e, which has slits 2a forming expansion pieces 2c between them and has joint ends 8.

2. Using a die or other apparatus (not shown), the arcuate member 2e is bent or formed so that the pieces 2c have the radius of curvature R1 (FIG. 9) in the lateral direction at each point of their inner peripheral walls, which is substantially the same as (in actuality it is slightly larger than) the radius of curvature R2 of each respective point on the bolt head 1a with which the expansion pieces 2c come in contact after expansion of the pieces.

3. The arcuate member 2e is then rolled into a cylinder and the joint ends 8 are connected by welding.

As illustrated, there are thin connections between the expansion pieces 2c at the upper ends of the slits 2a.

In the second method of manufacturing the expander, as shown in FIGS. 18 or 19, the base parts are the expansion pieces 2c which are completely separate throughout their lengths, and these pieces are assembled to form the annular expander. The radius of curvature at the lower end of the inner peripheral wall of each piece 2c is R1, and the radius of curvature at the upper end of the inner peripheral wall is substantially the same as the radius of curvature R4 (FIG. 9) of the inner peripheral wall of the sleeve 2.

FIG. 20 shows a resistance welding apparatus of a first embodiment of the second method, for joining the separate pieces 2c shown in FIG. 19. The apparatus includes an annular rotatable index table 9 on which the pieces 2c to be assembled are placed, a pair of electrodes 10 and 11 both adapted to hold the pieces, a fixed hydraulic cylinder 20 and a movable hydraulic cylinder 21 for moving the electrodes 10 and 11, respectively, radially of the table 9, another fixed cylinder 22 for moving the electrode 11 along the table 9, a holder 13 provided on the table 9 and associated with the electrode 10, and another holder 14 interconnected with the electrode 11.

The method using this apparatus includes the following steps:

1. Separate pieces 2c such as that shown in FIG. 19 are formed by a press or another means to have the curvature shown in FIG. 18. Each piece 2c has a joint or welding margin 15 slightly larger than the size of the part which, upon completion, becomes the thin connection between the separate pieces 2c when they are formed into the expander.

2. Two of the pieces 2c are fed to the table 9 of the apparatus of FIG. 20. One of the pieces, i.e. the first piece, is held by the electrode 10 and the holder 13. The second piece is held by the electrode 11 an the holder 14.

3. The second piece is moved together with the electrode 11 and holder 14 by the action of the cylinder 22 toward the first piece, and the two pieces come in contact with each other at the welding margin 15.

4. The margin 15 is then heated by passing electric current between the electrodes 10 and 11, so that approximately $\frac{1}{3}$ to $\frac{1}{2}$ of the margin 15 is melted and pieces 2e are welded together.

5. All of the electrodes and holders release the pieces, and the electrode 11 and the holder 14 are retracted to the initial positions by the cylinder 22 and a spring, respectively.

6. The table 9 rotates clockwise to shift the joined pieces 2c until the second piece comes between the electrode 10 and holder 13.

7. The electrode 10 and holder 13 hold the second piece, and the electrode 11 and holder 14 hold the newly fed third piece.

8. The third piece is likewise moved and welded to the second piece.

9. The operation is repeated to complete an annular expander 2e, as shown in FIGS. 21 and 22, having welds 15.

In another embodiment of the second manufacturing method, the number of separate pieces 2c as shown in FIG. 18, without a joint margin, needed to form one expander are arranged in the shape of a cylinder on a rotatable table (not shown). Two adjacent pieces are joined by arc welding at their upper ends, with a welding rod (not shown) positioned between the pieces on the inside of the cylinder shape, to form a joint 17 between the pieces as shown in FIGS. 23 and 24. The pieces are shifted by the rotatable table one after another until all of the joints between the pieces are welded.

Alternatively, the pieces 2e may be joined by brazing, mechanical joints such as tongue-and-groove, hook-and-eye, crimping, etc.

Anchor bolts according to invention can be used, for example, to secure objects to a solidified concrete surface. In other words, these anchor bolts can be used, for example, to secure frame, hand railings, etc., to such structures as office buildings, warehouses, bridges, roads, etc.

An anchor bolt according to this invention has important advantages and results. When the anchor bolt is embedded in a concrete mounting surface, because the curvature of the inner peripheral walls of the annular expander is designed to be the same as the respective curvature of the outer peripheral wall of the flared part at the lower end of the bolt body, and also because the expander is effectively separated from the upper sleeve, good contact is obtained between the expansion pieces and the flared bolt head. As a result, after the embedding is complete, even if a powerful force acts upon the anchor bolt in the lateral direction, no gap will appear between the bolt head and the expansion pieces, and thus the anchor bolt can always be securely anchored in the hole in which it is embedded.

Furthermore, because the expander which comes in contact with the flared part of the bolt body is separated from the sleeve which is almost in contact with the upper part of the bolt body, there is little (or virtually no) internal stress to resist flaring when the expansion pieces at the lower end of the sleeve flare out, and thus the flaring can be accomplished with little force. Thus, even workers with little experience can easily embed the anchor bolt in the mounting surface, and also there is much less chance of the problem described previously occurring as a result of faulty flaring after the anchor bolt has been embedded.

In addition, although, because the manufacturing method includes expansion pieces for which the curvatures vary along the length, manufacturing is more difficult than in a method in which straight cylinders are used as the base part, such as in conventional sleeves, the processing can be made easier by separating the expander from the upper cylindrical part.

Regarding the first manufacturing method, as stated above, the manufacturing process is easier when the expander is separated from the upper cylindrical part than it is for a single piece sleeve.

However, as for the methods of manufacturing a separate expander, first, the obvious method would be an extension of the conventional method of using a cylinder as the base part and forming slits in the lower end. In this obvious method the base cylinder is separated into upper and lower parts in order to fabricate a cylinder for the upper part of the sleeve and a cylinder for the lower part of the sleeve, and of these two, the cylinder for the lower part of the sleeve is processed into the expander. With this method, an expander with a curvature which changes in the radial direction is formed in the cylinder for the lower part of the sleeve.

However, for an expander as shown in FIG. 9, although the approximate curvature R4 of the inner peripheral wall of the sleeve is the same as the curvature R3 of the bolt thread, the curvature R1 of the inner peripheral walls of the lower ends of the expansion pieces which are sectioned off by the slits is different from the two curvatures R4 and R3.

In other words, because the shape of the inner wall, which is difficult to process, is one in which the upper end is a perfect circle and the lower end resembles a polygon each side of which is curved, and in which the shape changes gradually between these two ends, it cannot be produced easily using the same technology as for making a simple cylinder.

In comparison to this obvious method, because the first manufacturing method of this invention starts with material in the form of a flat sheet rather than a cylinder as the base part of the expander, such processing as the forming of the slits in the base part and the forming of the changes in the curvature of the parts which will become the inner peripheral walls of the expansion sleeve pieces becomes much easier to perform.

In addition, by using the first manufacturing method, there is none of the waste of the cut away material which would occur when the base part is formed from the raw material if a solid cylinder was used as the base part as in the conventional method or in the obvious method described above.

With regard to the use of flat sheet material in place of a cylinder for the raw material, the second manufacturing method has the same operation as the first manufacturing method explained above.

Furthermore, in the second manufacturing method, because the expansion pieces, which both in the first manufacturing method explained above and in the conventional method were first formed when the slits were formed during processing, are individual pieces where each piece is completely separate from the others, and these pieces are used as the base part, not only is such processing as the forming of the changes in the curvature of the parts which will become the inner peripheral walls of the expansion pieces easier than in the obvious method described earlier, but the second manufacturing method is also even easier than the first manufacturing method, which also uses flat sheet material, because in the first method the flat sheets are larger and the processing involves complex shapes in which numerous slits are formed.

In addition, especially in comparison to the obvious method described earlier, instead of forming each of the expansion pieces by cutting a raw material which is difficult to handle and which has an awkward shape, such as a cylinder, they are formed by joining and assembling base parts which have a simpler and smaller shape, and thus this forming can be accomplished extremely easily by machine processing.

What is claimed is:

1. A method of manufacturing an annular expander for use with a bolt having a conical head, said head having a small radius of curvature at one end thereof, a large radius of curvature at the other end thereof, and a gradually changing radius of curvature between said ends, comprising the steps of
   (1) forming a fan-shaped flat material having slits forming pieces between them, each of said pieces having first and second ends, said first ends being interconnected and said slits extending to said second ends,
   (2) shaping said first end of each of said pieces to have said small radius of curvature of said one end of said head, said second end of each of said pieces to have said large radius of curvature of said other end of said head, and the portion of each of said pieces between said first and second ends to have a changing radius of curvature corresponding to said changing radius of curvature between said ends of said head, and
   (3) shaping said flat material into a substantially cylindrical expander.

2. A method of manufacturing an annular expander for use with a bolt having a conical head, said head having a small radius of curvature at one end thereof, a large radius of curvature at the other end thereof, and a gradually changing radius of curvature between said ends, comprising the steps of
   (1) forming a plurality of separate pieces, each of said pieces having first and second ends,
   (2) shaping said first end of each of said pieces to have said small radius of curvature of said one end of said head, said second end of each of said pieces to have said large radius of curvature of said other end of said head, and the portion of each of said pieces between said first and second ends to have a changing radius of curvature corresponding to said changing radius of curvature between said ends of said head, and
   (3) joining said first ends of said pieces to form a generally cylindrical shape.

* * * * *